United States Patent
Harper et al.

(10) Patent No.: US 8,412,889 B2
(45) Date of Patent: Apr. 2, 2013

(54) LOW-LEVEL CONDITIONAL SYNCHRONIZATION SUPPORT

(75) Inventors: David Harper, Seattle, WA (US); Burton Smith, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 934 days.

(21) Appl. No.: 12/252,467

(22) Filed: Oct. 16, 2008

(65) Prior Publication Data

US 2010/0100688 A1 Apr. 22, 2010

(51) Int. Cl.
*G06F 12/00* (2006.01)
*G06F 13/00* (2006.01)
*G06F 13/28* (2006.01)

(52) U.S. Cl. .................. 711/145; 711/E12.026

(58) Field of Classification Search .......... 711/145, 711/E12.026
See application file for complete search history.

(56) References Cited

U.S. PATENT DOCUMENTS

| | | | |
|---|---|---|---|
| 5,430,850 A | | 7/1995 | Papadopoulos et al. |
| 5,889,983 A | * | 3/1999 | Mittal et al. ............ 712/223 |
| 6,052,763 A | * | 4/2000 | Maruyama ............. 711/152 |
| 6,629,212 B1 | * | 9/2003 | Arimilli et al. ......... 711/144 |
| 6,748,498 B2 | * | 6/2004 | Gharachorloo et al. ... 711/141 |
| 2006/0143406 A1 | | 6/2006 | Chrysos et al. |
| 2006/0212868 A1 | | 9/2006 | Takayama et al. |
| 2007/0198785 A1 | | 8/2007 | Kogge |
| 2007/0271450 A1 | * | 11/2007 | Doshi et al. ............ 712/245 |
| 2008/0059963 A1 | | 3/2008 | Foo |

FOREIGN PATENT DOCUMENTS

WO 2006128891 A2 12/2006

OTHER PUBLICATIONS

Stein, et al., "Implementing Lightweight Threads", In Proceedings of USENIX Summer Technical Conference, San Antonio, TX, Jul. 1992, pp. 1-19.
Savage, et al., "Eraser: A Dynamic Data Race Detector for Multithreaded Programs", ACM Transactions on Computer Systems, vol. 15, No. 4, Nov. 1997, pp. 391-411.
Bogda, et al., "Removing Unnecessary Synchronization in Java", In Proceedings of the ACM SIGPLAN Conference on Object-Oriented Programming Systems, Languages & Applications (OOPSLA '99), 1999, Denver, USA, 12 pages.
Keckler, et al., "Exploiting Fine-Grain Thread Level Parallelism on the MIT Multi-ALU Processor", Proceedings of the 25th annual international symposium on Computer architecture (ISCA '98), pp. 306-317.

(Continued)

*Primary Examiner* — Sheng-Jen Tsai
(74) *Attorney, Agent, or Firm* — Ogilvie Law Firm

(57) ABSTRACT

A low-overhead conditional synchronization instruction operates on a synchronization variable which includes a lock bit, a state specification, and bits for user-defined data. The instruction specifies the memory address of the synchronization variable and a condition. During the synchronization instruction the condition is compared to the state specification within an atomic region. The match succeeds if the condition matches the state specification and the lock bit is clear. The synchronization instruction may operate with a cache under a cache coherency protocol, or without a cache, and may include a timeout operand.

20 Claims, 7 Drawing Sheets

OTHER PUBLICATIONS

Musuvathi, et al., "Iterative Context Bounding for Systematic Testing of Multithreaded Programs", Proceedings of the 2007 PLDI conference, Jun. 11-13, 2007, San Diego, California, USA, pp. 446-455.

"MWAIT—Monitor Wait", www.rz.uni.karlsruhe.de, 3 pages.

Zhu, et al., "Synchronization State Buffer: Supporting Efficient Fine-Grained Synchronization on Many-Core Architectures", ISCA '07, ACM, Jun. 9-13, 2007, pp. 35-45.

Alverson, et al., "The Tera Computer System", www.ai.mit.edu/projects/aries/course/notes/tera.pdf, 1990 ACM, 6 Pages.

Kenney, "Cache Coherency in Multiprocessor Systems", people.engr.ncsu.edu/efg/506/sum99/001/lec9-coherence.pdf, 1999, 10 Pages.

Smith, "Architecture and applications of the HEP multiprocessor computer system", SPIE 298, 1981, pp. 231-238.

* cited by examiner

```
consumer {
      expiration = TIMEOUT_VALUE;
      while (!done) {
consumer_loop:
            // 3 conditions of interest
            // W F
            // 0 0 - buffer is empty and there are no waiters
            //     - uninteresting, continue waiting
            // 0 1 - buffer is full and there are no waiters
            //     - most common, consume buffer and continue
            // 1 0 - buffer is empty, consumer is waiting
            //     - no point waiting - won't be next, Q myself
            // 1 1 - buffer is full, producer is waiting
            //     - consume buffer and release waiter
            EMPTY_NO_WAITERS = 0x01
            FULL_NO_WAITERS = 0x02
            EMPTY_CONSUMER_WAITING = 0x04
            FULL_PRODUCER_WAITING = 0x08
            // return once one of these 3 conditions is true
            // FULL_NO_WAITERS is the fast path
            mwaitc( &pipecontrol, (FULL_NO_WAITERS),
                  (EMPTY_CONSUMER_WAITING |
                  FULL_PRODUCER_WAITING),    expiration)
            // one instruction overhead to dispatch slow paths
            jna slow_paths // if didn't get lock or are waiters
            // CF == 0 and ZF == 0; consume and continue
            data = readbuffer
            pipecontrol.F = 0
            pipecontrol.lock = 0
            goto consumer_loop // done
slow_paths:
            if (CF==1) goto consumer_loop
            //spurious or timeout-no lock
            // not sure want this - if we don't get the lock we
            // continue to issue waitc instructions
            if (!pipecontrol.F) {
                  // add me to list of waiting consumers
                  AddToWaiterList(&pipecontrol, me)
                  BlockContext(me)
            }
            if (pipecontrol.F) { // consume buffer, wake waiter
                  data = readbuffer
                  pipecontrol.F = 0
                  // How does lock ownership work?
                  // If we care about ordering the waiter being
                  // woken the one to fill the buffer
                  WakeupWaiter(&pipecontrol) // lock to waiter
            }
      }
}
```

Fig. 7

```
producer {
      expiration = TIMEOUT_VALUE;
      while (!done) {
producer_loop:
            // 3 conditions of interest
            // W F
            // 0 0 - buffer is empty and there are no waiters
            //     - fill and continue, common case
            // 0 1 - buffer is full and there are no waiters
            //     - uninteresting
            // 1 0 - buffer is empty, consumer is waiting
            //     - fill buffer, release waiter
            // 1 1 - buffer is full, producer is waiting
            //     - queue up
            EMPTY_NO_WAITERS = 0x01
            FULL_NO_WAITERS = 0x02
            EMPTY_CONSUMER_WAITING = 0x04
            FULL_PRODUCER_WAITING = 0x08
            // return once one of these 3 conditions is true
            // EMPTY_NO_WAITERS is the fast path
            mwaitc( &pipecontrol,  (EMPTY_NO_WAITERS),
                   (EMPTY_CONSUMER_WAITING |
                   FULL_PRODUCER_WAITING),       expiration)
            jna slow_paths   // didn't get lock or are waiters
            // produce to buffer and continue
            writebuffer(data)
            pipecontrol.F = 1
            pipecontrol.lock = 0
            goto producer_loop // done
slow_paths:
            if (CF == 1) goto producer_loop
            // spurious or timeout - no lock
            // same issue as for consumer
            if (pipecontrol.F) {
                // add me to list of waiting producers
                AddToWaiterList(&pipecontrol, me)
                BlockContext(me)
            }
            if (!pipecontrol.F) { //produce buffer, wake waiter
                writebuffer(data)
                pipecontrol.F = 1
                WakeupWaiter(&pipecontrol) // lock ownership
   to waiter (?)
            }
      }
}
```

Fig. 8

LOW-LEVEL CONDITIONAL SYNCHRONIZATION SUPPORT

BACKGROUND

Software may be parallelized to permit faster execution, to organize workflow, to provide redundancy, and/or to support distributed processing, for example. Parallel computing environments have been designed in various configurations. Some include a single processor running multiple threads; some include multiple processors running multiple threads. In some multiprocessor configurations, all of the processors are functionally equal, whereas in other configurations some processors differ from other processors by virtue of having different hardware capabilities, different software assignments, or both.

Within a multithreaded environment, a given thread may need an ability to communicate with another thread, an ability to synchronize its own execution with the execution of another thread, or both. Locks are sometimes used for synchronizing threads in multithreaded computing systems, and to help control inter-thread communication. Some systems provide hardware support for locks through atomic instructions, such as a test-and-set atomic instruction which tests whether a lock is free and acquires the lock if it is free, or a compare-and-swap atomic instruction which compares the content of a memory location to a given value and modifies the memory location content if it was the same as the given value.

SUMMARY

Regardless of the programming model used in a parallel computation, and the particular problem being addressed, the parallel computation can benefit from reduced thread synchronization overhead. Some embodiments discussed herein provide a low-overhead synchronization variable and an assembly language synchronization instruction which operates on the synchronization variable. The synchronization variable includes a lock bit, a state specification, and bits for user-defined data. The instruction specifies the memory address of the synchronization variable and also specifies a condition. The condition is compared to the state specification within an atomic region during execution of the synchronization instruction. If certain match requirements are met then the lock bit is set within the atomic region and a success indicator is returned by the synchronization instruction. The match requirements are met when the condition matches the state specification and the lock bit is clear. If the match requirements are not met, the synchronization instruction returns a failure indicator.

In some embodiments, the synchronization instruction operates with a cache coherency protocol having a shared state and an exclusive state, such as a MESI protocol. In some embodiments that do not require a cache, a memory controller performs the comparison and sets the lock bit within the atomic region. In some embodiments, the synchronization instruction specifies a timer period, and indicates whether the condition failed to match the state specification before the timer period expired.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 7 is a pseudo-code listing of a consumer thread in an example illustrating use of a synchronization instruction operating on a synchronization variable; and FIG. 8 is a pseudo-code listing of a producer thread in the example of FIG. 7.

DETAILED DESCRIPTION

Overview

Figure 1:
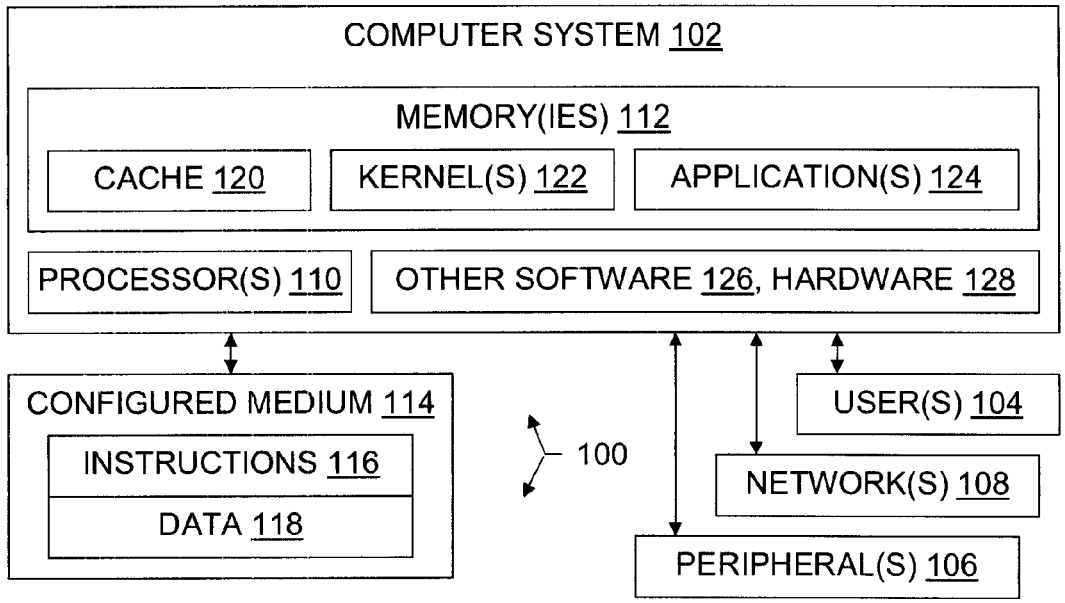
FIG. 1 is a block diagram illustrating a computer system having a processor and a memory in an operating environment, and also illustrating configured storage medium embodiments.

Regardless of the programming model used and the particular problem domain being addressed, concurrency can be exploited more fully when synchronization overheads are lower. Some embodiments provided herein include a syncvar, synchronization variable which is a machine level data type, and mwaitc, a synchronization instruction which operates on a syncvar. The mwaitc instruction is added to the assembly language instruction set, with underlying hardware support. Together the synchronization variable and the synchronization instruction facilitate two-phase waiting, which may reduce the overhead associated with thread level synchronization in shared memory programming models.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

A "primitive data type" is a data type for which an entire variable or other instance can be directly operated on by a single assembly language instruction. For example, float64 is primitive if the instruction set architecture includes 64-bit floating point instructions. Examples of other common primitive hardware data types include int32 and address.

"Code" means processor instructions, data (which includes data structures), or both instructions and data.

It will be understood that swapping "clear" and "set" with regard to a lock bit in the present discussion will result in a system having functionally equivalent behavior. In other words, it does not matter whether 0 or 1 is chosen as the value for a "clear" lock bit, so long as one is consistent.

Whenever reference is made to data or instructions, it is understood that these items configure a computer-readable memory or are embedded in computer circuitry, as opposed to simply existing on paper, in a person's mind, or as a transitory signal on a wire, for example.

Throughout this document, use of the optional plural "(s)" means that one or more of the indicated feature is present. For example, "state(s)" means "one or more states" or equivalently "at least one state".

Operating Environments

With reference to FIG. 1, an operating environment 100 for an embodiment may include a computer system 102. The computer system 102 may be a multiprocessor computer system, or not. An operating environment may include one or more computer systems, which may be clustered, client-server networked, and/or peer-to-peer networked. Some operating environments include a stand-alone (non-networked) computer system.

Human users 104 may interact with the computer system 102 by using displays, keyboards, and other peripherals 106. Engineers, developers, and system administrators are understood to each be a particular type of user 104; end-users are also considered users 104. Automated agents may also be users 104. Storage devices and/or networking devices may be considered peripheral equipment in some embodiments. Other computer systems (not shown) may interact with the computer system 102 or with another system embodiment using one or more connections to a network 108 via network interface equipment, for example.

The computer system 102 includes at least one logical processor 110. The computer system 102, like other suitable systems, also includes one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. Synchronization instructions are an example of instructions 116. Synchronization variables are an example of data 118.

The instructions 116 and the data 118 configure the memory 112/medium 114 in which they reside; when that memory is a functional part of a given computer system, the instructions 116 and data 118 also configure that computer system. Memories 112 may be of different physical types. Memory 112 may include one or more caches 120. Kernels 122, applications 124 and other code may reside partially or entirely within one or more memories 112, thereby configuring those memories. Other software 126 and other hardware 128 than that already enumerated may also be present, such as buses, power supplies, drivers, diagnostics, and so on.

Some of the suitable operating environments for some embodiments include or help create a Microsoft® Visual Studio® development environment (marks of Microsoft Corporation) configured to support source code development. Some suitable operating environments include Java® environments (mark of Sun Microsystems, Inc.), and some include environments which utilize languages such as C++ or C#, but teachings herein are applicable with a wide variety of programming languages, programming models, and programs, as well as with endeavors outside the field of software development.

Systems

Figure 2:
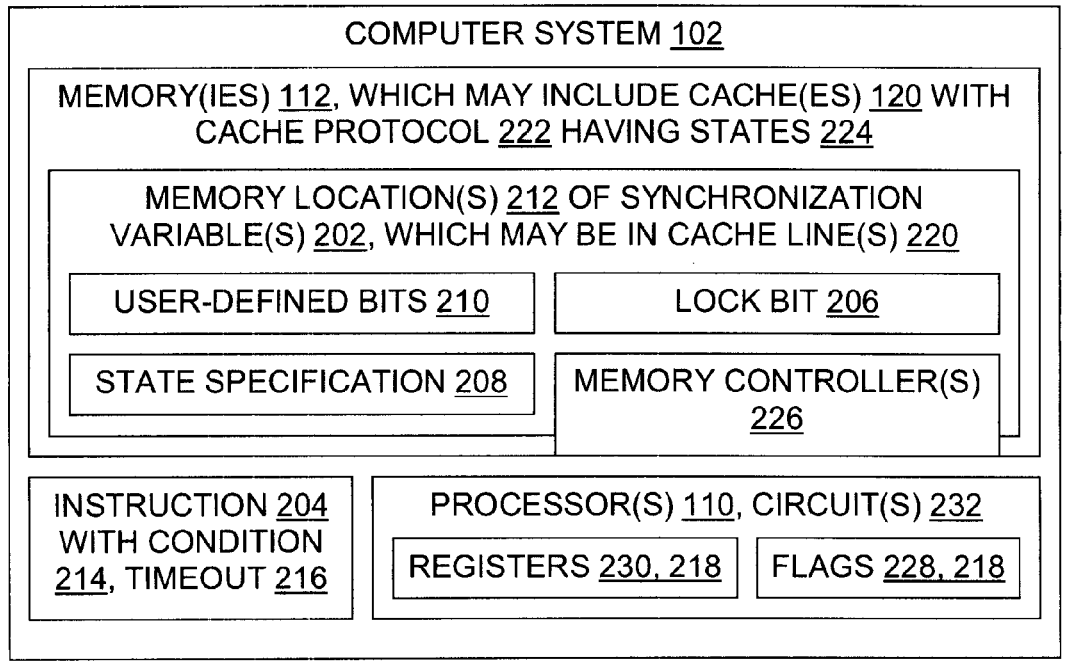
FIG. 2 is a block diagram illustrating a computer system configured with synchronization variables and synchronization instructions.

Referring now to FIGS. 1 and 2, some embodiments provide a computer system 102 having a processor 110 in operable communication with a memory 112 that contains a synchronization variable 202 and a synchronization instruction 204.

In general, a synchronization variable 202 is a variable containing a lock bit 206, a state specification 208, and user-defined bits 210. A particular 64-bit synchronization variable 202 is described below as an example.

In general, a synchronization instruction 204 is an assembly language or lower level instruction which explicitly or implicitly specifies a memory location 212 containing a synchronization variable 202, specifies a condition 214, and executes using the synchronization variable 202 and the condition 214 in a manner consistent with at least one execution method described herein. A particular synchronization instruction 204 denoted mwaitc is described below as an example.

A syncvar is a primitive hardware data type, whose lock bit and state specification are operated on by the mwaitc instruction, for instance. The structure of one 64-bit syncvar synchronization variable 202 includes a lock bit in bit 0, a three-bit state specification in bits 1 . . . 3, and user-defined data in bits 4 . . . 63. Other synchronization variables 202 may assign different locations to the lock bit 206 field, the state specification 208 bit field, and/or the user-defined data bit 210 field. Other synchronization variables 202 may also use a different number of bits in these fields or overall, and may contain additional bit fields used for other purposes, for example. The syncvar's 60-bit user defined field may be used, for instance, to link with additional data structures. Some uses of the syncvar's lock bit and state specification are discussed below.

An mwaitc instruction (a conditional mwait instruction) is a synchronization instruction 204 whose operands include an address specifying the memory location 212 of a syncvar, two bit fields specifying a condition 214, and a timeout 216 specifying a period within which the condition must match the syncvar state specification if the mwaitc is to succeed. Other synchronization instructions 204 may use different syntax, may specify the condition differently, and may omit the timeout entirely or rely on an implicit timeout, for example.

One mwaitc instruction has the following syntax:

retc=mwaitc(addr, fp_spec, zf_spec, timeout)

This mwaitc operates on a syncvar data type identified by the address addr in the first parameter, and causes execution to wait until a specified condition becomes true or timeout occurs. When the specified condition becomes true, the mwaitc instruction completes. The condition is specified in this mwaitc instruction by the bitwise-OR of two 8-bit fields, fp_spec and zf_spec. Each of the bits in the result of the bitwise-OR represents one of the possible states of the 3-bit syncvar state specification value. A match occurs when the state specification field of the syncvar operand is in one of the condition states indicated by the result of the bitwise-OR, and the lock bit field of the syncvar is also clear. The timeout parameter forces the mwaitc instruction to complete even in situations where no condition match occurs.

In one contemplated x86 implementation, completion of the mwaitc instruction causes the EFLAGS register to be modified as shown by Table 1 and, if the instruction completed due to a condition match, the instruction will set the lock bit field of the operand syncvar.

TABLE 1 mwaitc result codes.

| EFLAGS bits | Definition |
|---|---|
| CF | $1 \Rightarrow$ mwaitc returned due to timeout or spurious condition; |
| | $0 \Rightarrow$ mwaitc returned due to condition match (syncvar lock was set by this instruction). |
| ZF | $1 \Rightarrow$ mwait condition matched against specifier encoded by zf_spec; |
| | $0 \Rightarrow$ mwait condition did not match against specifier encoded by zf_spec. |
| OF, PF, SF | Reflect value of syncvar.state[2:0]; |
| | $OF \Rightarrow$ syncvar.state[2]; |
| | $PF \Rightarrow$ syncvar.state[1]; |
| | $SF \Rightarrow$ syncvar.state[0]. |

An intended use of fp_spec and zf_spec is to encode conditions requiring fast path handling with fp_spec and to use zf_spec to encode other conditions of interest. This approach allows use of a single JNA instruction (jump on CF==1 or ZF==1) to branch to out-of-line code in an x86 implementation, for example, and fast path conditions may be similarly separated out within other implementations. The fall-through code path then handles the fast path conditions. Execution semantics of mwaitc are discussed in greater detail below, in connection with FIGS. 3 through 5, for instance.

With continued reference to FIGS. 1 and 2, some embodiments include a computer system 102 which has a memory 112 having a lock bit 206 stored at a memory location 212 and a state specification 208 also stored at the memory location. That is, the lock bit 206 and the state specification 208 are stored within bit fields of the same word, cache line 220, or other addressable unit of memory. At least one processor 110 of the system 102 is in operable communication with the memory 112. The processor(s) 110 may include x86 processor(s), 68K processor(s), RISC processor(s), and/or other processor architecture(s), in single- or multi-core chip(s).

The system 102 also includes an indicator 218 which is generated as follows. Within an atomic region, a condition 214 is compared to the state specification 208. If certain match requirements are met, then the lock bit 206 is set within the atomic region and a success indicator 218 is generated; the match requirements are met when the condition matches the state specification and the lock bit is clear. If the match requirements are not met then a failure indicator 218 is generated. The generated indicator 218 resides in a processor 110 hardware flag 228, in a processor 110 or other register 230, or in a combination of flags and registers. Within a given system

102, one or more of the following components may be configured to perform operations within the atomic region: a single machine instruction 116 such as an mwaitc synchronization instruction 204, a sequence of machine instructions 116, a sequence of microcode instructions controlling a processor 110, a semiconductor logic circuit 232. An example of a condition 214 is the fp_spec and zf_spec parameters in the mwaitc instruction, and an example of a state specification 208 is the three state bits in the syncvar.

In some embodiments the system 102 includes a memory controller 226 which is configured to perform the comparing step and the lock bit setting step within an atomic region. These memory controller embodiments do not necessarily include a cache 120.

However, in some embodiments the system 102 includes a cache 120, which operates under a cache protocol 222 have certain states 224. For example, the cache protocol 222 may be a cache coherency protocol having Modified (M), Exclusive (E), Shared (S), and Invalid (I) states 224, that is, a MESI protocol. Other cache protocols may also be used in a given embodiment. In some embodiments, the system 102 has a cache 120 configured to operate under a cache protocol 222 having at least a shared state 224 and an exclusive state 224. In these embodiments, the indicator 218 is generated by a method which includes acquiring a cache line 220 in the shared state outside the atomic region; comparing the condition 214 to the state specification 208 outside the atomic region; if match requirements are met in the shared state then entering the atomic region and acquiring the cache line in the exclusive state, comparing the condition to the state specification within the atomic region and if the match requirements are met then setting the lock bit 206 within the atomic region and returning a success indicator 218, and if the match requirements are not met within the atomic region then exiting the atomic region without setting the lock bit. If the match requirements are not met in the shared state then a failure indicator 218 is returned.

In various embodiments, the condition 214 and the state specification 208 may each specify one or more states. For example, in one embodiment the condition 214 identifies multiple states, the state specification 208 identifies at least one state, and the condition matches the state specification if the intersection of condition states and state specification state(s) is non-empty. In some embodiments, the condition includes a Boolean combination of values, using Boolean operators such as bitwise-AND, bitwise-OR, and bitwise-NOT, for example.

In some embodiments, peripherals 106 such as human user I/O devices (screen, keyboard, mouse, microphone, speaker, motion sensor, etc.) will be present in operable communication with one or more processors 110 and memory 112. However, an embodiment may also be deeply embedded in a system, such that no human user 104 interacts directly with the embodiment. Software processes may be users 104.

In some embodiments, networking interface equipment provides access to networks 108, using components such as a packet-switched network interface card, a wireless transceiver, or a telephone network interface, for example, will be present in the computer system. However, an embodiment may also communicate through direct memory access, removable nonvolatile media, or other information storage-retrieval and/or transmission approaches, or an embodiment in a computer system may operate without communicating with other computer systems.

Methods

Figure 3:
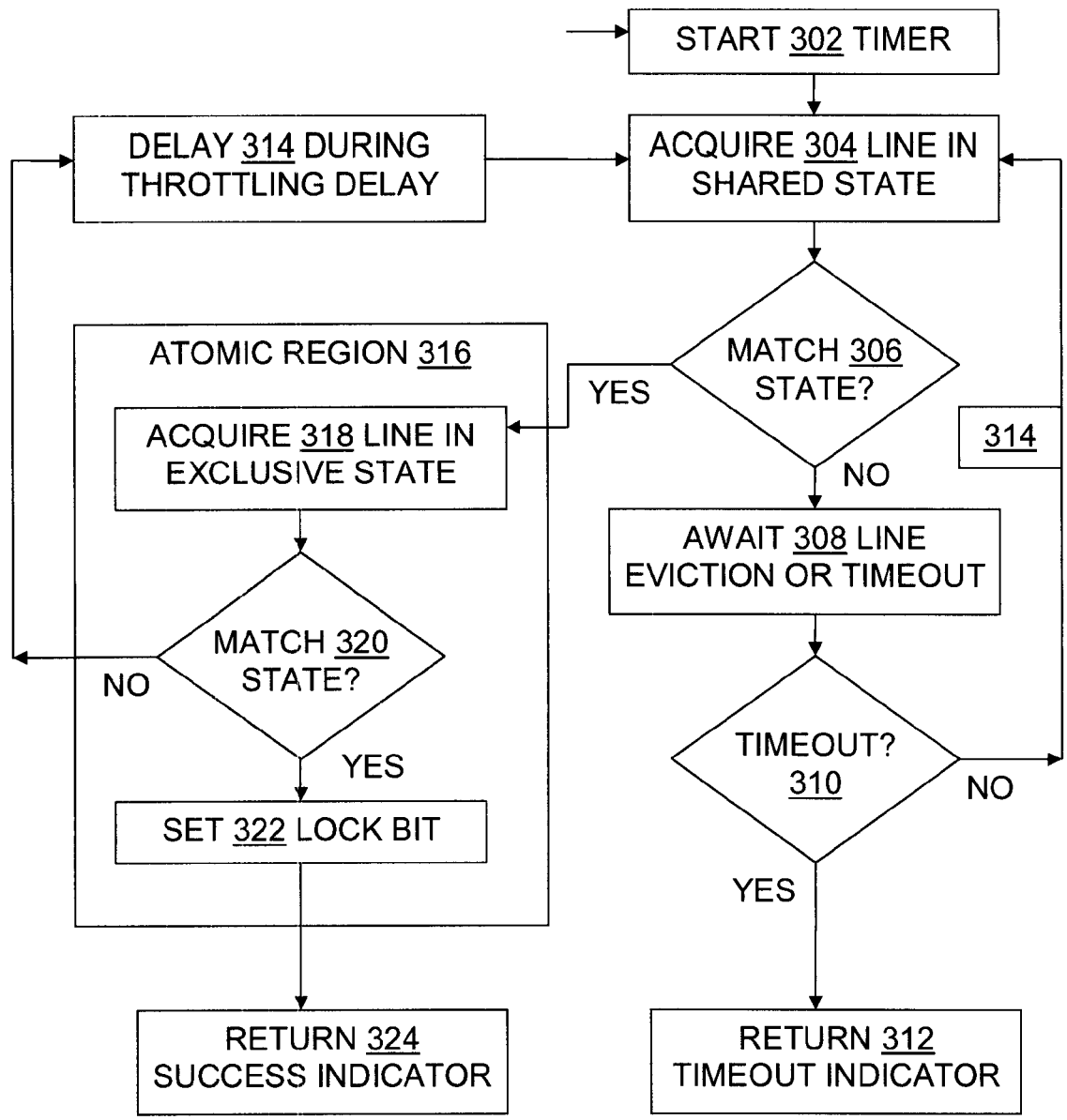
FIG. 3 is a flow chart illustrating steps of some cache-based method, system with configured memory, and configured storage medium embodiments, in which a synchronization instruction operates on a synchronization variable stored in a cache.
Figure 4:
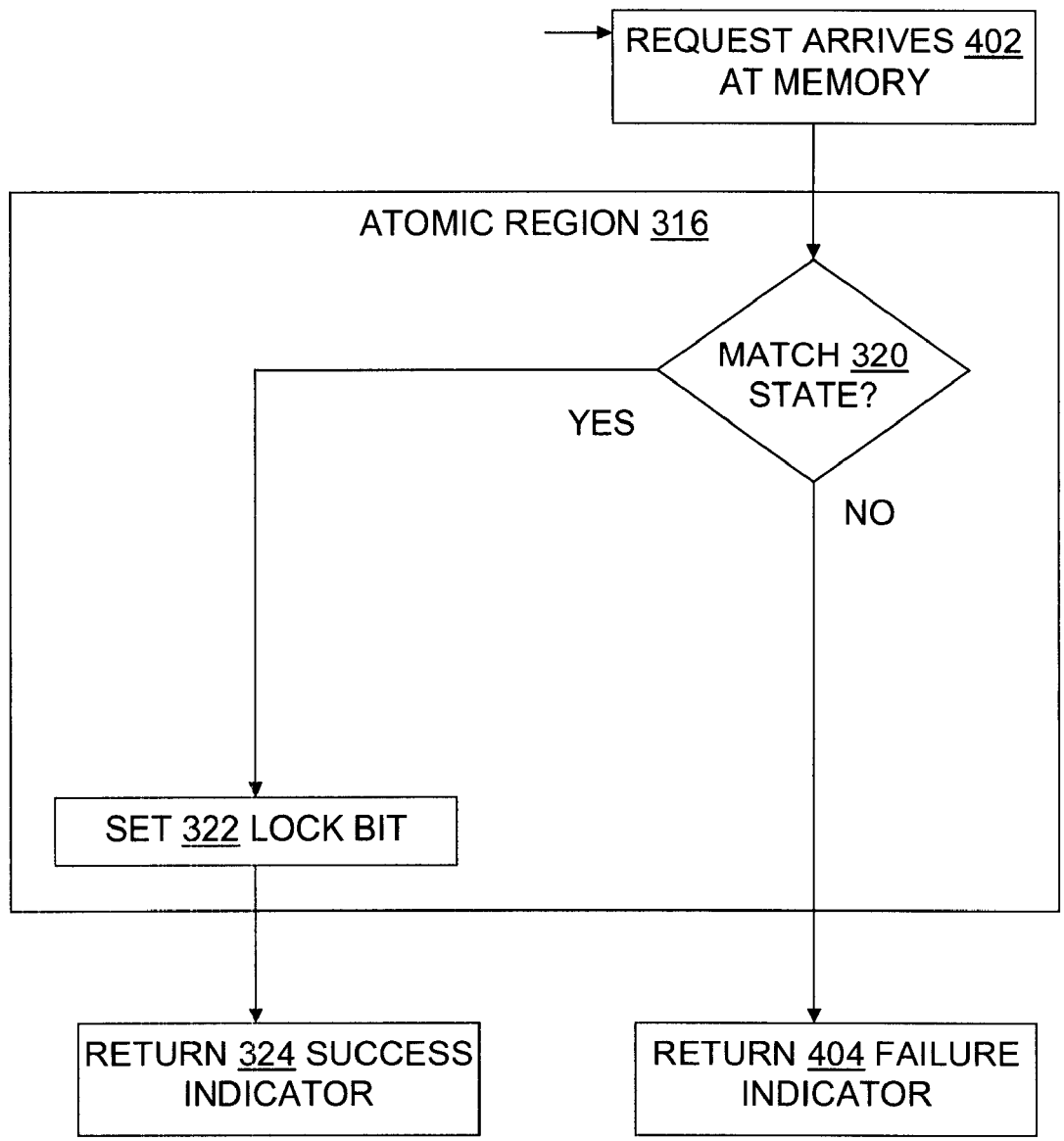
FIG. 4 is a flow chart illustrating steps of some memory-controller-based polling method, system with configured memory, and configured storage medium embodiments, in which a synchronization instruction operates on a synchronization variable without requiring a cache.
Figure 5:
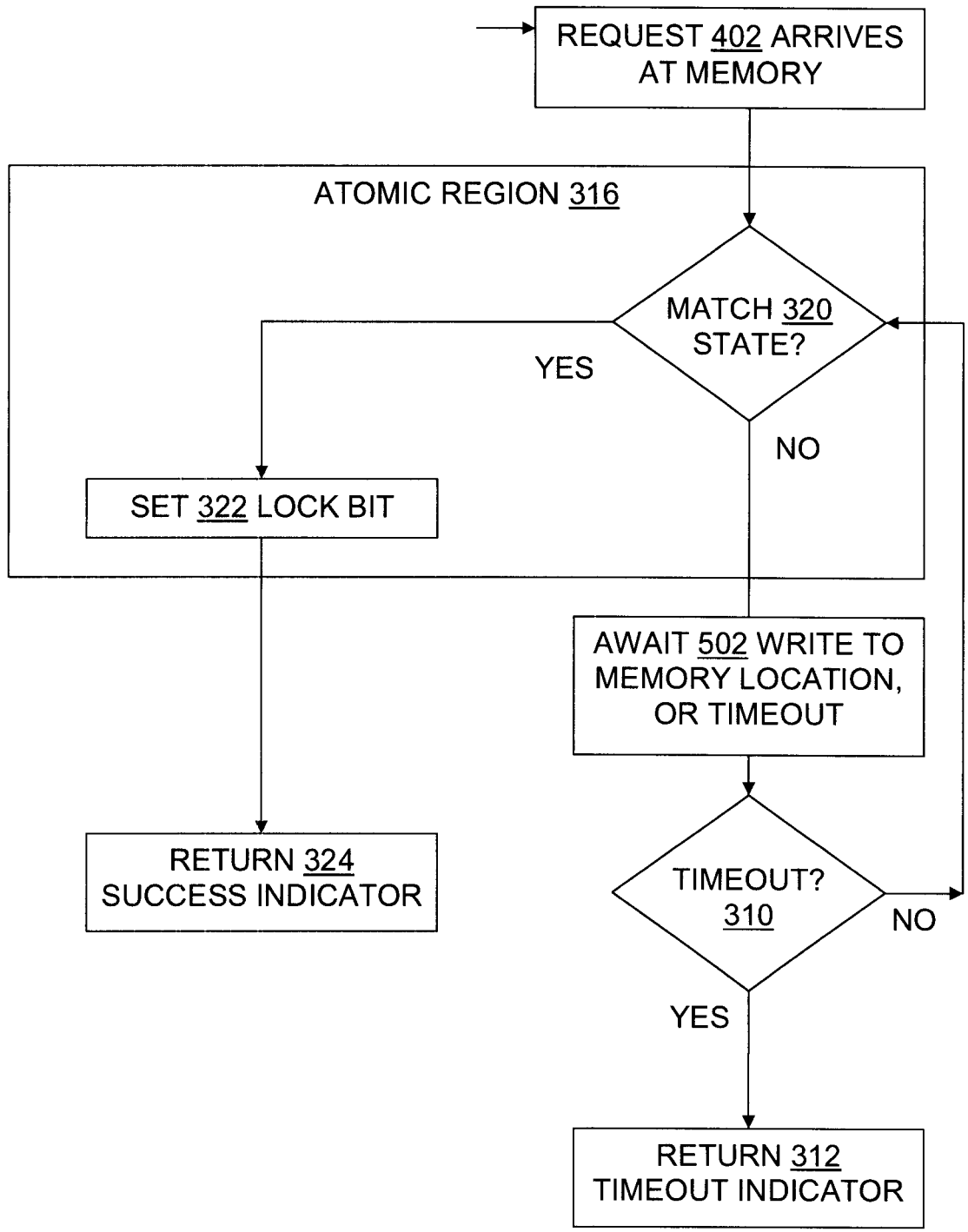
FIG. 5 is a flow chart illustrating steps of some memory-controller-based timeout method, system with configured memory, and configured storage medium embodiments, in which a synchronization instruction operates on a synchronization variable without requiring a cache.

FIGS. 3 through 5 each illustrate some methods which may be viewed as methods for generating indicators 218. These methods may be also viewed as some of the possible execution semantic specifications for mwaitc or another synchronization instruction 204, or they can be viewed as execution semantics for a system 102 which provides support for low-level conditional synchronization through operations on synchronization variables 202.

FIG. 3 shows execution steps in an embodiment having a cache 120 with a cache coherency protocol 222, and a synchronization instruction 204 whose parameters include not only a condition 214 but also a timeout 216. A timer is started 302 and a cache line 220 containing a synchronization variable 202 is acquired 304 in a shared state. A test 306 checks whether the condition 214 matches the synchronization variable's state specification 208. If there is no match, execution awaits 308 a timeout or a cache line eviction caused, e.g., by some other process acquiring the cache line in an exclusive state. A timeout determining test 310 then checks whether the step 302 timer timed out, and returns 312 a timeout indicator 218 if the timer has expired. If timeout did not occur, execution returns to step 304, possibly after a throttling delay 314, to re-acquire the cache line in a shared state.

However, if the test 306 finds a match between the condition 214 and the state specification 208 while the cache line 220 is held in a shared state, then execution enters an atomic region 316. Within the atomic region, the cache line is acquired 318 in an exclusive state, and a test 320 checks again whether the condition 214 matches the synchronization variable's state specification 208. If there is no match, execution returns to step 304, after an optional throttling delay 314, to re-acquire the cache line in a shared state. But if there is a match at test 320 then the synchronization variable's lock bit 206 is set 322 within the atomic region 316, the atomic region is exited, and execution returns 324 a success indicator 218. Optimizations may be possible by tighter coupling to the cache coherence mechanism, by selection or omission of throttling delay period(s), and/or by selection or omission of a particular timeout period.

There are also at least two kinds of memory controller based implementation for synchronization instructions and synchronization variables. A first implementation, illustrated in FIG. 4, is a polling-based implementation that checks for a state match, locks the syncvar if a match is found, and returns a success/failure indication to the processor. A timeout associated with the mwaitc operation could be provided by a timer loop at the processor 110.

More precisely, the FIG. 4 semantics execution method begins when a request to access a synchronization variable 202 arrives 402 at a memory 112 which is accessed through a memory controller 226. The memory controller 226 and/or an associated logic circuit 232 then performs the other indicated steps, namely, entering the atomic region 316, testing 320 for a match between the synchronization instruction's condition 214 and the synchronization variable's state specification 208, and either setting 322 the lock bit and returning 324 success or else returning 404 failure, depending on whether the test 320 found a condition match or not. The execution semantics illustrated in FIG. 4 do not require a cache coherency protocol 222 or even a cache 120.

A second kind of memory controller based implementation is shown in FIG. 5, namely, deferred operation at the memory controller. This execution semantics implements a timeout counter at the memory controller, by starting a timer when the request arrives 402 at memory, and testing 310 for a timeout if the condition state is not matched inside the atomic region. The setting of the lock bit could have been performed by another thread. The failure to match (and the ensuing timeout) could have been due to no activity on the syncvar. The execution semantics illustrated in FIG. 5 do not require a cache coherency protocol 222 or cache 120.

Implicit in the semantics of the mwaitc synchronization instruction 204 is the use of the syncvar's lock bit 206, which is used to provide mutual exclusion to the data structure to which the syncvar pertains. A specified mwaitc condition 214 leads to a success indicator 218 only if the syncvar lock bit is clear. When the condition evaluates true (matches a state in the state specification 208) and control is returned from the synchronization instruction 204 to allow further execution of the thread, the lock bit 206 will be set. The lock bit 206 will not be set by the thread's mwaitc instruction on a timeout, although the lock bit may appear set due to another thread having set the lock bit. Lock bit set and clear operations are performed atomically by the hardware to avoid software race conditions. Setting the lock bit on condition match can provide a thread with exclusive access to the state specification 208 and user-defined bits 210 of the syncvar if all of the threads base syncvar access on mwaitc instructions.

Figure 6:
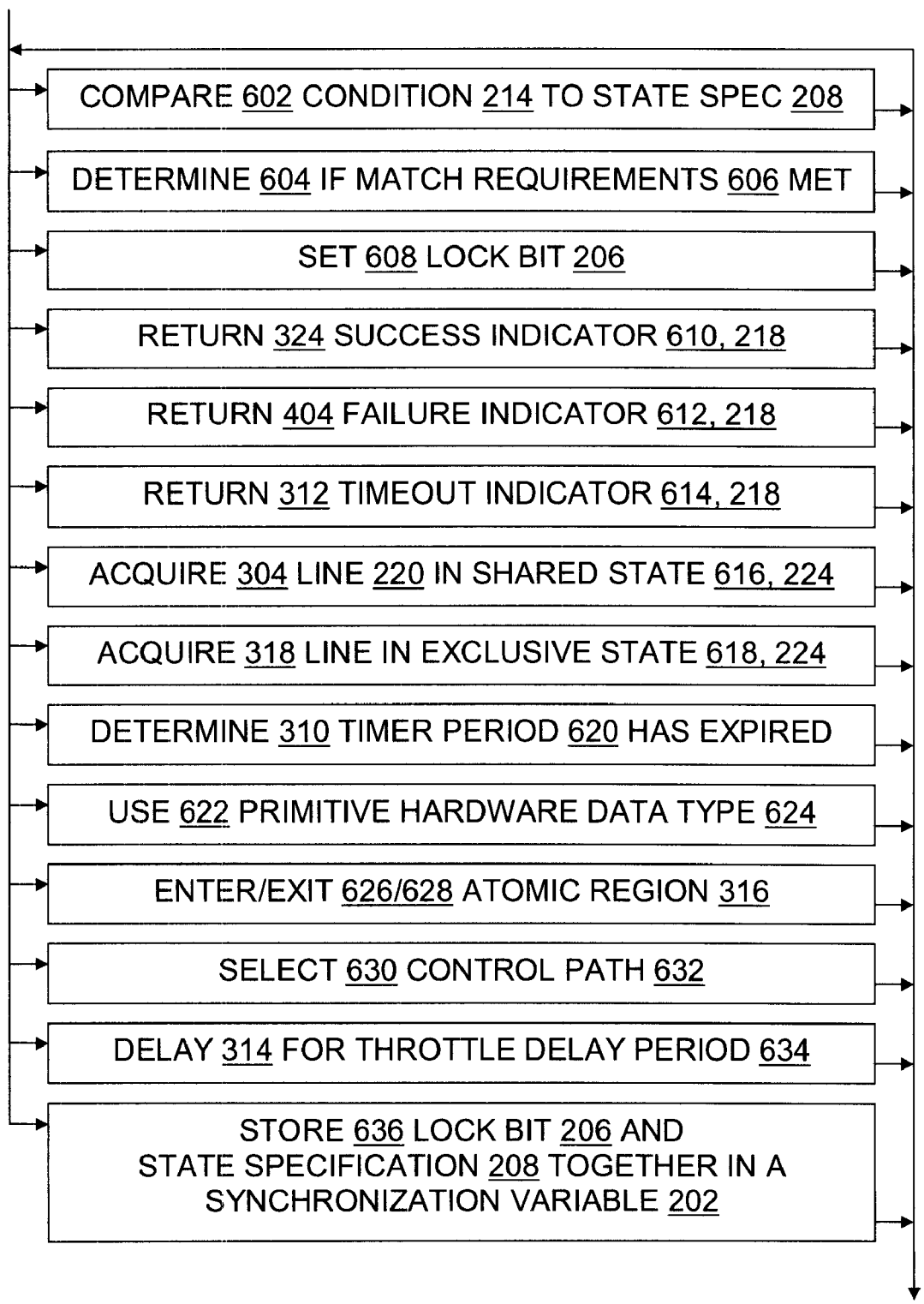
FIG. 6 is a flow chart further illustrating method, system with configured memory, and configured storage medium embodiments.

FIG. 6 further illustrates method embodiments in a flowchart 600. In a given embodiment zero or more illustrated steps of a method may be repeated, perhaps with different parameters or data to operate on. Steps in an embodiment may also be done in a different order than the top-to-bottom order that is laid out in FIG. 6. Steps may be performed serially, in a partially overlapping manner, or fully in parallel. The order in which flowchart 600 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

During a comparing step 602, an embodiment compares a condition 214 in a synchronization instruction to a state specification in a synchronization variable. Bit operations, logic circuitry, and/or other mechanisms may be used to perform the comparison. As noted herein, the comparing step 602 is performed in an atomic region in some instances.

During a determining step 604, an embodiment determines whether certain match requirements 606 are met. The match requirements 606 include having a clear lock bit 206 and having a match between the condition 214 state(s) and the state specification 208 state(s).

During a setting step 608, an embodiment sets a lock bit 206.

During a success returning step 324, an embodiment returns a success indicator 610. Like other indicators 218, the success indicator 610 may be implemented as a register 230 value, a flag 228 value, or some combination of such values.

During a failure returning step 404, an embodiment returns a failure indicator 612, which is an indicator 218 indicating that match requirements 606 were not met.

During a timeout returning step 312, an embodiment returns a timeout indicator 614, which is an indicator 218 that match requirements 606 were not met and that timeout occurred while trying to meet the match requirements.

During a shared state line acquiring step 304, an embodiment acquires, in a cache coherency protocol shared state 616, a cache line 220 containing a synchronization variable 202.

During an exclusive state line acquiring step 318, an embodiment acquires, in a cache coherency protocol exclusive state 618, a cache line 220 containing a synchronization variable 202.

During an expiration determining step 310, an embodiment determines whether a timer period 620 has expired.

During a primitive hardware data type using step 622, an embodiment uses a synchronization variable 202 as an instance of a primitive hardware data type 624. Step 622 may be accomplished on a system 102 by any operation using a synchronization variable 202 if the system 102 supports synchronization variables as a primitive hardware data type.

During an atomic region entering step 626 and an atomic region exiting step 628, an embodiment enters or exits, respectively, an atomic region such as atomic region 316. That is, an execution of a synchronization attempt on a system 102 enters/exits an atomic region.

During a selecting step 630, an embodiment selects a control path 632 based at least in part on an indicator 218 generated by using synchronization instruction(s) 204 and synchronization variable(s) 202. Examples are given in FIGS. 7 and 8, and discussed in connection with the fp_spec parameter.

During a throttle delaying step 314, an embodiment delays execution for at least a throttle delay period 634. A suitable throttle delay period 634 may be chosen based on experimentation with the particular configuration involved.

During a storing step 636, an embodiment stores a lock bit 206 and a state specification 208 together in a synchronization variable 202. Unless otherwise indicated, storing step 636 is implicit in the embodiments illustrated by FIGS. 2 through 5.

Some embodiments provide a synchronization method utilizing a lock bit, which begins by comparing 602 a condition to a state specification within an atomic region. If it is determined 604 that match requirements are met, then the lock bit is set 608 within the atomic region and a success indicator is returned 324; the match requirements are met when the condition matches the state specification and the lock bit is clear. If the match requirements are not met then a failure indicator is returned 404. In some embodiments, the lock bit and the state specification are located within a synchronization variable implemented by a primitive hardware data type.

In some embodiments, the method operates in connection with a cache coherency protocol 222 having a shared state 616 and an exclusive state 618. The embodiment begins by acquiring 304 a cache line in the shared state outside the atomic region, and then compares the condition to the state specification outside the atomic region. If match requirements are met in the shared state then execution enters 626 the atomic region, acquires 318 the cache line in the exclusive state, and compares the condition to the state specification within the atomic region. If the match requirements are met within the atomic region, the lock bit is set 608 within the atomic region and a success indicator is returned 324. If the match requirements are not met within the atomic region then the atomic region is exited 628 without setting the lock bit. If the match requirements are not met in the shared state, execution returns 404 a failure indicator.

In some embodiments, a memory controller 226 performs the comparing step and the lock bit setting step within the atomic region. In some embodiments, the method includes determining 310 that a timer period has expired since comparison of the condition and the state specification, and then returning 312 a timer-expired indicator 614. The timer period may be specified as part of an assembly-level software instruction, as contents of a hardware register, or as part of a semiconductor logic circuit, for example.

Configured Media

Some embodiments include a configured computer-readable storage medium 114, which is an example of a memory 112. Memory 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory 112, which may be removable or not, and may be volatile or not, can be configured into an embodiment using items such as synchronization instructions 204 and synchronization variables 202, in the form of data 118 and instructions 116, read from a removable medium 114 and/or another source such as a network connection, to form a configured medium. The configured memory 112 is capable of causing a computer system to perform method steps for synchronization as disclosed herein. FIGS. 1 through 5 thus help illustrate configured storage media embodiments and method embodiments, as well as system embodiments. In particular, any of the method steps illustrated in FIGS. 3 through 6, or otherwise taught herein, and any of the components shown in FIG. 2, may be used in any combination to configure or to help configure a storage medium to form a configured medium embodiment.

Producer-Consumer Example

As a further illustration, FIGS. 7 and 8 contain a pseudocode implementation of a multiple producer, multiple consumer pipeline using an mwaitc synchronization instruction 204 as a synchronization primitive. A syncvar variable 202, named pipecontrol, is used in implementing flow control. In this example, the pipeline buffer depth is 1. Generalization to a deeper buffer can be done by using two condition bits to encode {not full, not empty, other} status and metadata to encode current and maximum buffer occupancy. F is used as an alias for pipecontrol.state[0] and will indicate whether the buffer is full (1) or empty (0). W (waiters) is an alias for pipecontrol.state[1] and will indicate whether there are contexts suspended on the pipecontrol syncvar. In this particular scenario, pipecontrol.state[2] is unused.

Contexts wait for buffer status changes using a two-level protocol. The first level of waiting is done within the mwaitc instruction as an efficient spin-wait. If a timeout occurs on the first level waiting operation, the waiting protocol moves to a second level that is managed by thread software above the mwaitc level of granularity.

Examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

CONCLUSION

Although particular embodiments are expressly illustrated and described herein as methods, as configured media, or as systems, it will be appreciated that discussion of one type of embodiment also generally extends to other embodiment types. For instance, the descriptions of methods in connection with FIGS. 3 through 6 also help describe configured media, and help describe the operation of systems and manufactures like those discussed in connection with FIGS. 1 and 2. It does not follow that limitations from one embodiment are necessarily read into another. In particular, methods are not necessarily limited to the data structures and arrangements presented while discussing systems or manufactures such as configured memories.

Not every item shown in the Figures need be present in every embodiment. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A synchronization method utilizing a lock bit in a computing system which also has a cache, the cache having cache lines, operation of the cache in the computing system being subject to a cache protocol which has at least a shared state and an exclusive state, the method comprising the steps of:

acquiring a cache line in the shared state outside an atomic region;

comparing a condition to a state specification outside the atomic region, the state specification occupying a different location in the computing system than the lock bit occupies in the computing system, and the state specification capable of identifying at least three states;

if match requirements are met in the shared state then entering the atomic region and acquiring the cache line in the exclusive state, comparing the condition to the state specification within the atomic region and if the match requirements are met then setting the lock bit within the atomic region and returning a success indicator, and if the match requirements are not met within the atomic region then exiting the atomic region without setting the lock bit, the match requirements being met when the condition matches the state specification and the lock bit is clear; and if the match requirements are not met in the shared state then returning a failure indicator.

2. The method of claim 1, wherein a memory controller performs the comparing step and the lock bit setting step within the atomic region.

3. The method of claim 1, wherein the method further comprises determining that a timer period has expired since comparing the condition to the state specification, and returning a timer-expired indicator.

4. The method of claim 3, wherein the method further comprises specifying the timer period via at least one of the following: as part of an assembly-level software instruction, as contents of a hardware register, as part of a semiconductor logic circuit.

5. The method of claim 1, wherein the lock bit and the state specification are located within a synchronization variable implemented by a primitive hardware data type, namely, a data type for which an entire variable can be directly operated on by a single assembly language instruction.

6. A computer system comprising:
a memory having a lock bit stored at a memory location and a state specification stored in at least two other bits which are also located at the memory location;
a processor in operable communication with the memory;
a cache configured to operate under a cache protocol having a shared state and an exclusive state; and
an indicator generated by the following method:
acquiring a cache line in the shared state outside an atomic region;
comparing a condition to the state specification outside the atomic region;
if match requirements are met in the shared state then entering the atomic region and acquiring the cache line in the exclusive state, comparing the condition to the state specification within the atomic region and if the match requirements are met then setting the lock bit within the atomic region and returning a success indicator, the match requirements being met when the condition matches the state specification and the lock bit is clear, and if the match requirements are not met within the atomic region then exiting the atomic region without setting the lock bit; and
if the match requirements are not met in the shared state then returning a failure indicator.

7. The computer system of claim 6, wherein the system comprises a memory controller configured to perform the comparing step and the lock bit setting step within the atomic region.

8. The computer system of claim 6, wherein the condition identifies multiple states, the state specification identifies at least one state, and the condition matches the state specification if the intersection of condition states and state specification state(s) is non-empty.

9. The computer system of claim 6, wherein the condition includes a Boolean combination of values.

10. The computer system of claim 6, wherein the indicator resides in at least one processor hardware flag.

11. The computer system of claim 6, wherein the processor includes an x86 processor.

12. The computer system of claim 6, wherein the system comprises at least one of the following configured to perform operations within the atomic region: a single machine instruction, a sequence of machine instructions, a semiconductor logic circuit.

13. A storage medium configured with computer code for controlling a system to perform a synchronization method utilizing a lock bit, the method operating in connection with a cache protocol having a shared state and an exclusive state, the method comprising the steps of:
acquiring a cache line in the shared state outside an atomic region;
comparing a condition to a state specification outside the atomic region, the state specification capable of specifying at least three states and being located in different bits than the lock bit;
if match requirements are met in the shared state then entering the atomic region and acquiring the cache line in the exclusive state, comparing the condition to the state specification within the atomic region and if the match requirements are met then setting the lock bit within the atomic region and returning a success indicator, the match requirements being met when the condition matches the state specification and the lock bit is clear, and if the match requirements are not met within the atomic region then exiting the atomic region without setting the lock bit; and
if the match requirements are not met in the shared state then returning a failure indicator.

14. The configured medium of claim 13, wherein the method uses a processor hardware flag to indicate that a timeout period has expired.

15. The configured medium of claim 13, wherein the method further comprises selecting a control path for program execution based on a returned indicator after comparing the condition to the state specification.

16. The configured medium of claim 13, wherein the method further comprises delaying for a throttle delay period after comparing the condition to the state specification and determining that the match requirements are not met.

17. The configured medium of claim 13, wherein the lock bit and the state specification operated on by the method are stored together in a synchronization variable.

18. The configured medium of claim 13, wherein the condition includes a Boolean combination of values.

19. The method of claim 1, wherein the condition identifies multiple states, the state specification identifies at least one state, and the condition matches the state specification if the intersection of condition states and state specification state(s) is non-empty.

20. The computer system of claim 6, wherein the system comprises a sequence of microcode instructions configured to perform operations within the atomic region.

* * * * *